US010527110B2

(12) United States Patent
Ohr et al.

(10) Patent No.: US 10,527,110 B2
(45) Date of Patent: Jan. 7, 2020

(54) CYLINDRICAL BI-DIRECTIONAL WEDGE CLUTCH

(71) Applicant: Schaeffler Technologies AG & Co. KG, Herzogenaurach (DE)

(72) Inventors: Carsten Ohr, Charlotte, NC (US); Brian Lee, York, SC (US); Benjamin Smith, Lilburn, GA (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 498 days.

(21) Appl. No.: 15/464,857

(22) Filed: Mar. 21, 2017

(65) Prior Publication Data

US 2018/0274605 A1    Sep. 27, 2018

(51) Int. Cl.
| *F16D 41/08* | (2006.01) |
| *F16D 41/06* | (2006.01) |
| *F16D 15/00* | (2006.01) |
| *F16D 41/063* | (2006.01) |
| *F16D 23/12* | (2006.01) |

(52) U.S. Cl.
CPC ........... *F16D 41/082* (2013.01); *F16D 15/00* (2013.01); *F16D 41/063* (2013.01); *F16D 2023/123* (2013.01)

(58) Field of Classification Search
None
See application file for complete search history.

(56) References Cited

U.S. PATENT DOCUMENTS

| 3,279,571 | A | * | 10/1966 | Wassilieff | F16D 13/06 |
| | | | | | 192/38 |
| 4,361,216 | A | * | 11/1982 | Overbeek | F16D 41/105 |
| | | | | | 192/36 |
| 6,257,386 | B1 | * | 7/2001 | Saito | F16D 27/10 |
| | | | | | 192/37 |
| 6,409,000 | B1 | * | 6/2002 | Itoh | B60K 17/26 |
| | | | | | 180/247 |
| 9,334,907 | B2 | | 5/2016 | Ohr et al. | |
| 2015/0060223 | A1 | * | 3/2015 | Ohr | F16D 41/082 |
| | | | | | 192/45.1 |

* cited by examiner

*Primary Examiner* — Colby M Hansen

(57) ABSTRACT

A cylindrical bi-directional wedge clutch, including: an axis of rotation; a carrier ring; a hub; a wedge plate including at least a portion radially disposed between the carrier ring and the hub; and a wedge element displaceable, for first and second locked modes in which the hub and the carrier ring are non-rotatably connected, in a first axial direction to contact the wedge plate and expand the wedge plate radially outwardly, and displaceable, for a free-wheel mode in which the hub and the carrier ring are rotatable with respect to each other, in a second axial direction, opposite the first axial direction. For the first locked mode, the hub and carrier ring are arranged to rotate in a first circumferential direction. For the second locked mode, the hub and the carrier ring are arranged to rotate in a second circumferential direction, opposite the first circumferential direction.

20 Claims, 8 Drawing Sheets

CYLINDRICAL BI-DIRECTIONAL WEDGE CLUTCH

TECHNICAL FIELD

The present disclosure relates to a cylindrical bi-directional wedge clutch, in particular, a wedge clutch that is controllably switchable between a free-wheel mode, a first locked mode for torque transfer in a first circumferential direction, and a second locked mode for torque transfer in a second circumferential direction.

BACKGROUND

Known wedge plate clutches are typically limited to one-way clutch applications and do not enable bi-directional operation.

SUMMARY

According to aspects illustrated herein, there is provided a cylindrical bi-directional wedge clutch, including: an axis of rotation; a carrier ring; a hub; a wedge plate including at least a portion radially disposed between the carrier ring and the hub; and a wedge element displaceable, for first and second locked modes in which the hub and the carrier ring are non-rotatably connected, in a first axial direction to contact the wedge plate and expand the wedge plate radially outwardly, and displaceable, for a free-wheel mode in which the hub and the carrier ring are rotatable with respect to each other, in a second axial direction, opposite the first axial direction. For the first locked mode, the hub and carrier ring are arranged to rotate in a first circumferential direction. For the second locked mode, the hub and carrier ring are arranged to rotate in a second circumferential direction, opposite the first circumferential direction.

According to aspects illustrated herein, there is provided a cylindrical bi-directional wedge clutch, including: an axis of rotation; a carrier ring; a hub including a radial outer surface with first and second ramp surfaces; a wedge plate including at least a portion radially disposed between the carrier ring and the hub and including a radial inner surface with third and fourth ramps surfaces; and a wedge element displaceable, in a first axial direction, for first and second locked modes in which the hub, the wedge plate, and the carrier ring are non-rotatably connected, to expand the wedge plate radially outwardly, and, displaceable in a second axial direction, opposite the first axial direction, for a free-wheel mode in which the hub and the carrier ring are rotatable with respect to each other. For the first locked mode, the hub and carrier ring are arranged to rotate in the first circumferential direction. For the second locked mode, the hub and carrier ring are arranged to rotate in a second circumferential direction, opposite the first circumferential direction.

According to aspects illustrated herein, there is provided a cylindrical bi-directional wedge clutch, including: an axis of rotation; a carrier ring; a hub; a wedge plate including at least a portion radially disposed between the carrier ring and the hub and including a first circumferential end, a second circumferential end facing the first circumferential end in a first circumferential direction, and a gap, in the first circumferential direction, between the first and second circumferential ends; and a wedge element, displaceable in a first axial direction to engage the first and second circumferential ends, and to expand the wedge plate radially outwardly for first and second locked modes in which the hub, the wedge plate and the carrier ring are non-rotatably connected. For a first locked mode, the hub and carrier ring rotate in the first circumferential direction. For a second locked mode, the hub and carrier ring rotate in a second circumferential direction, opposite the first circumferential direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 10:
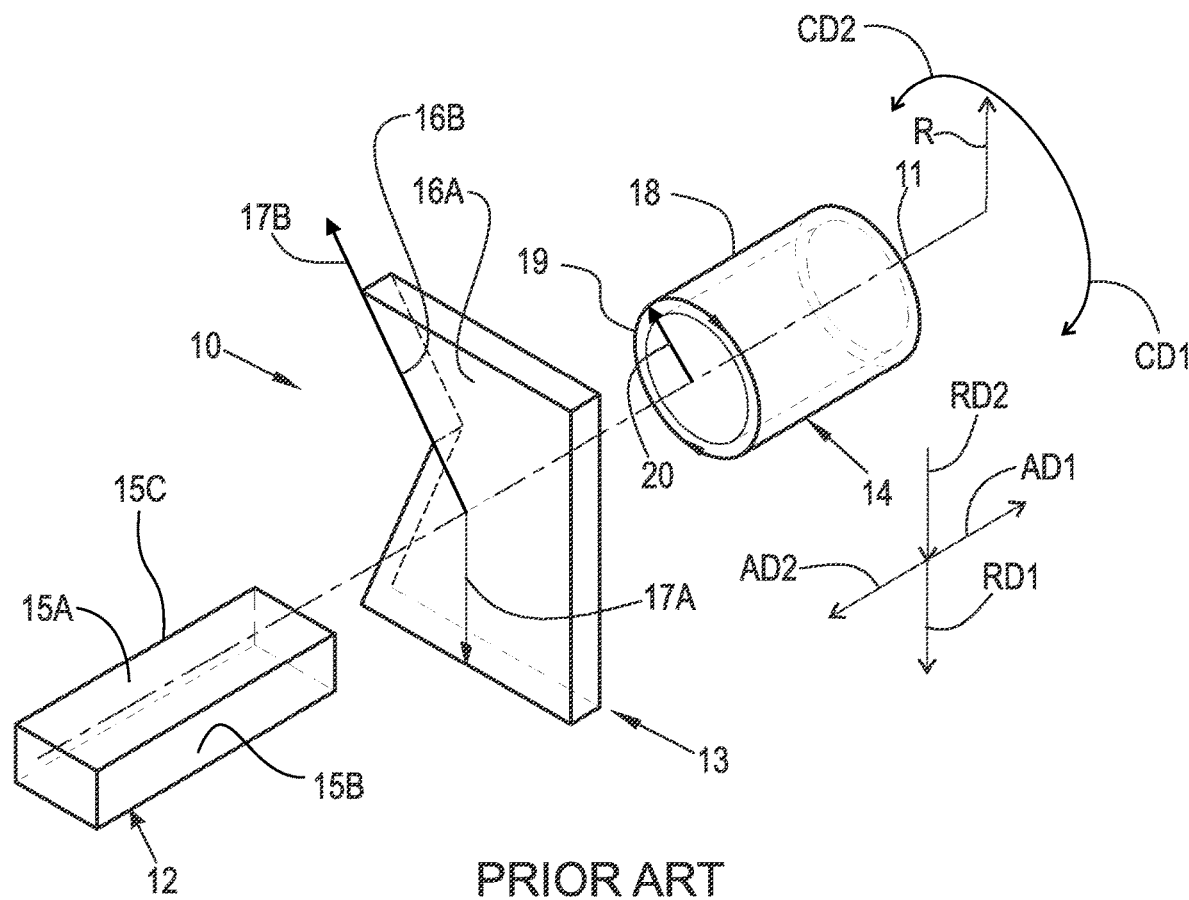
FIG. 10 is a perspective view of a cylindrical coordinate system demonstrating spatial terminology used in the present application.

FIG. 10 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in direction axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
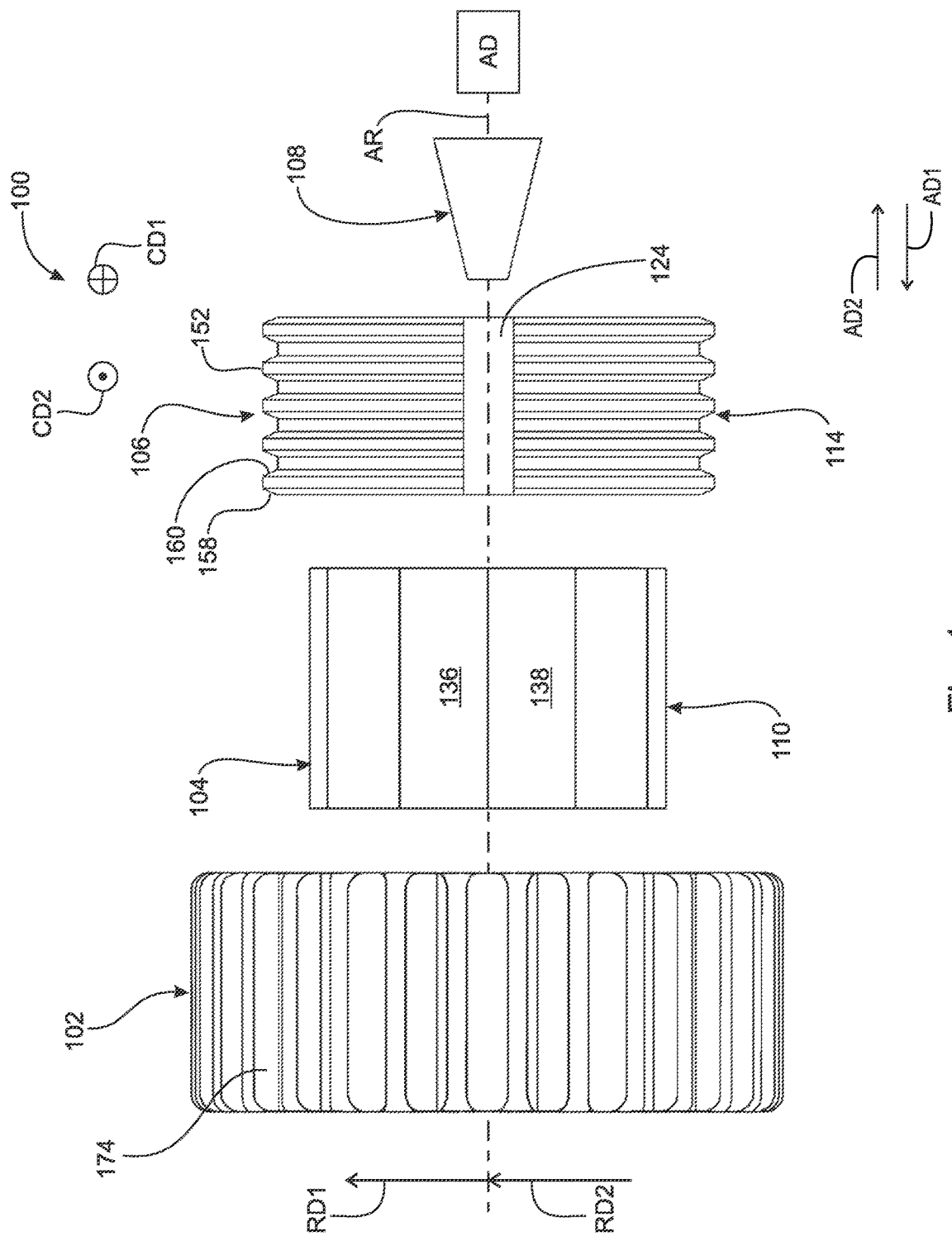
FIG. 1 is an exploded view of a cylindrical bi-directional wedge clutch.

FIG. 1 is an exploded view of cylindrical bi-directional wedge clutch 100.

Figure 2:
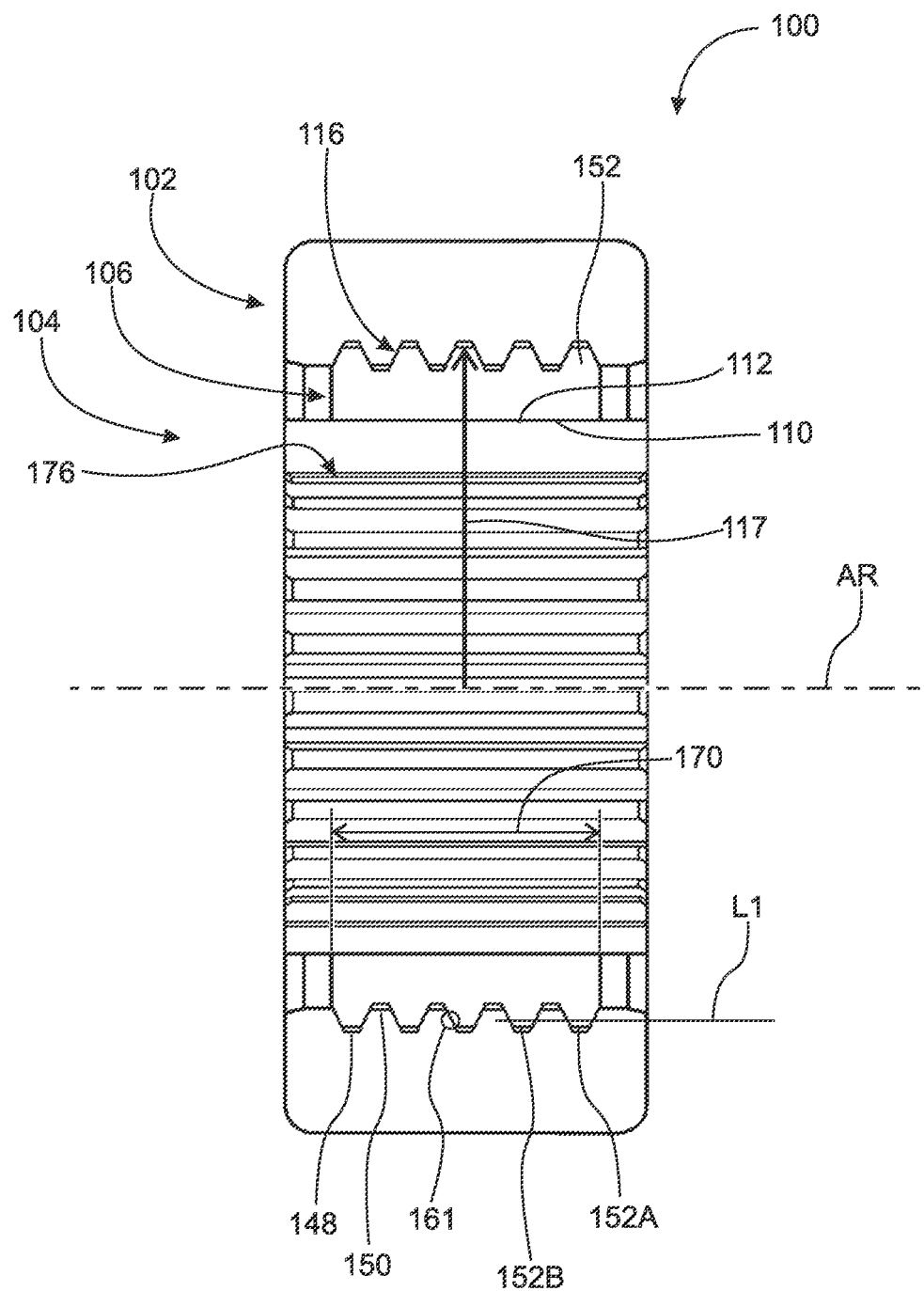
FIG. 2 is a cross-sectional view of the cylindrical bi-directional wedge clutch in FIG. 1 in a locked mode with the wedge element removed.

FIG. 2 is a cross-sectional view of cylindrical bi-directional wedge clutch 100 in FIG. 1 in a locked mode with a wedge element removed. The following should be viewed in light of FIGS. 1 and 2. Cylindrical bi-directional wedge clutch 100 includes: axis of rotation AR; carrier ring 102; hub 104; wedge plate 106; and wedge element 108. Wedge plate 106 is radially disposed between carrier ring 102 and hub 104. Wedge element 108 is displaceable in axial direction AD1, for first and second locked modes of clutch 100, to engage wedge plate 106 and expand wedge plate 106 radially outwardly to non-rotatably connect hub 104 and carrier ring 102.

Element 108 is arranged to contact plate 106 to initiate the first and second locked modes. For example, radial outer surface 110 of hub 104 and radial inner surface 112 of wedge plate 106 are non-rotatably connected and radial outer surface 114 of wedge plate 106 and radial inner surface 116 of carrier ring 102 are non-rotatably connected. As further described below, once clutch 100 is in the first or second locked mode, element 108 may or may not remain in contact with plate 106.

For a first operating mode: mode: hub 104 is arranged to receive torque in circumferential direction CD1 for the first locked mode; hub 104 is arranged to receive torque in circumferential direction CD2, opposite direction CD1, for the second locked mode; and hub 104 is arranged to transmit the torque to ring 102. Thus: in the first locked mode, hub 104 and carrier ring 102 rotate in circumferential direction CD1; and in the second locked mode, hub 104 and carrier ring 102 rotate in circumferential direction CD2.

For a second operating mode: mode: ring 102 is arranged to receive torque in circumferential direction CD1 for the first locked mode; ring 102 is arranged to receive torque in circumferential direction CD2 for the second locked mode; and ring 102 is arranged to transmit the torque to hub 104. Thus: in the first locked mode, hub 104 and carrier ring 102 rotate in circumferential direction CD1; and in the second locked mode, hub 104 and carrier ring 102 rotate in circumferential direction CD2.

By one component "engaged with" another component, we mean that the one component is in direct contact with the other component or the components are in contact with a mechanically solid intermediary or ancillary part. Engaged components can be in direct contact with each other. For example, a washer or coating could be disposed between the two components. By "non-rotatably connected" elements, we mean that: the elements are connected so that whenever one of the elements rotates, all the elements rotate; and relative rotation between the elements is not possible. Radial and/or axial movement of non-rotatably connected elements with respect to each other is possible, but not required.

Figure 3:
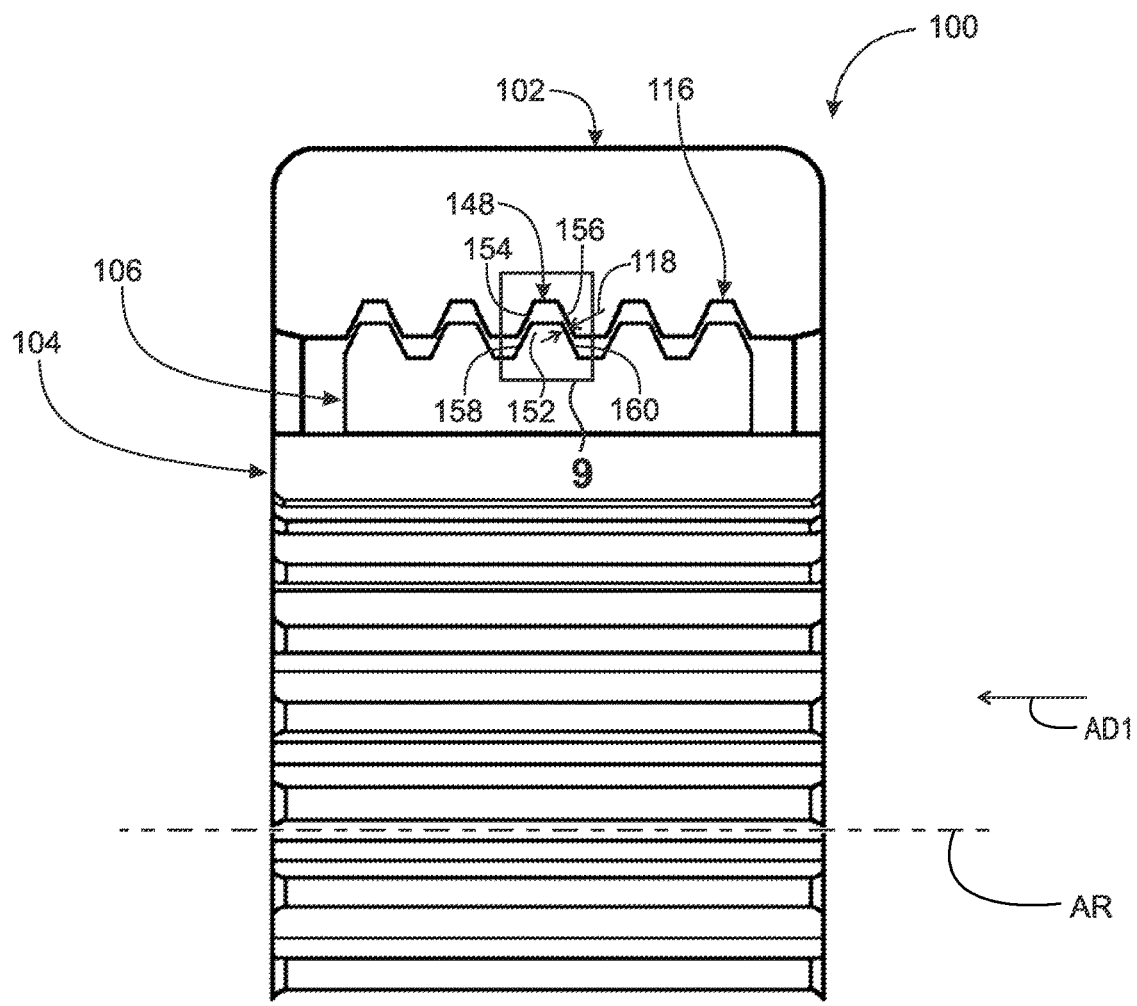
FIG. 3 is a cross-sectional view of the cylindrical bi-directional wedge clutch in FIG. 1 in a free-wheel mode with the wedge element removed.

FIG. 3 is a partial cross-sectional view of cylindrical bi-directional wedge clutch 100 in FIG. 1 in a free-wheel mode with wedge element 108 removed.

Figure 4:
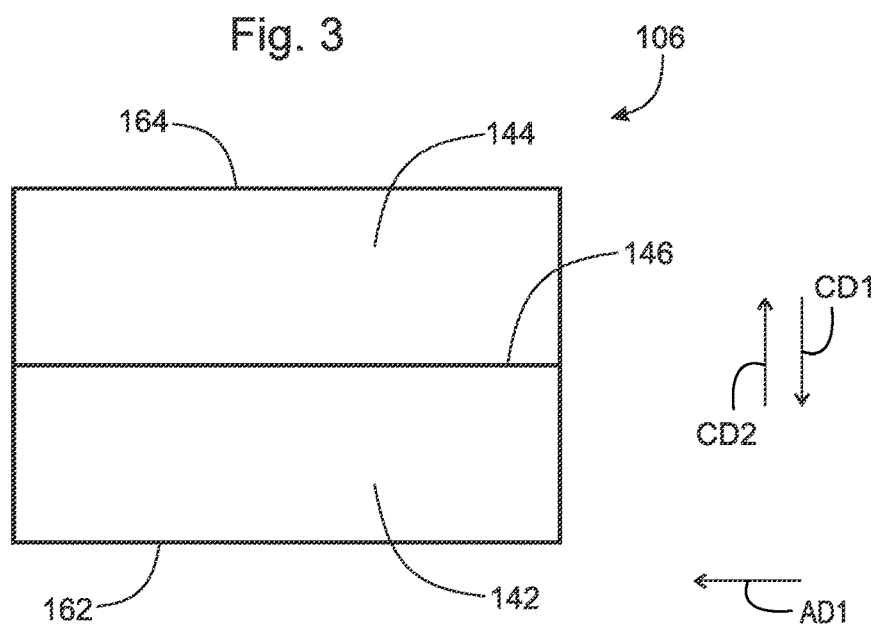
FIG. 4 is top view, in radial inward direction, of a portion of a wedge plate in FIG. 1.

FIG. 4 is top view (in direction RD2) of a portion of wedge plate 106 in FIG. 1. The following should be viewed in light of FIGS. 1 through 4. The following discussion is directed to both the first and second operating modes of clutch 100. To transition from the first or second locked mode of clutch 100 to the free-wheel mode of clutch 100, element 108 is displaceable in axial direction AD2, opposite axial direction AD1, to reduce dimension 117 (from axis AR to surface 114), in radial direction RD1, of wedge plate 106 and enable relative rotation between hub 104 and carrier ring 102. For example, gaps 118 are formed between surfaces 114 and 116.

Figure 5:
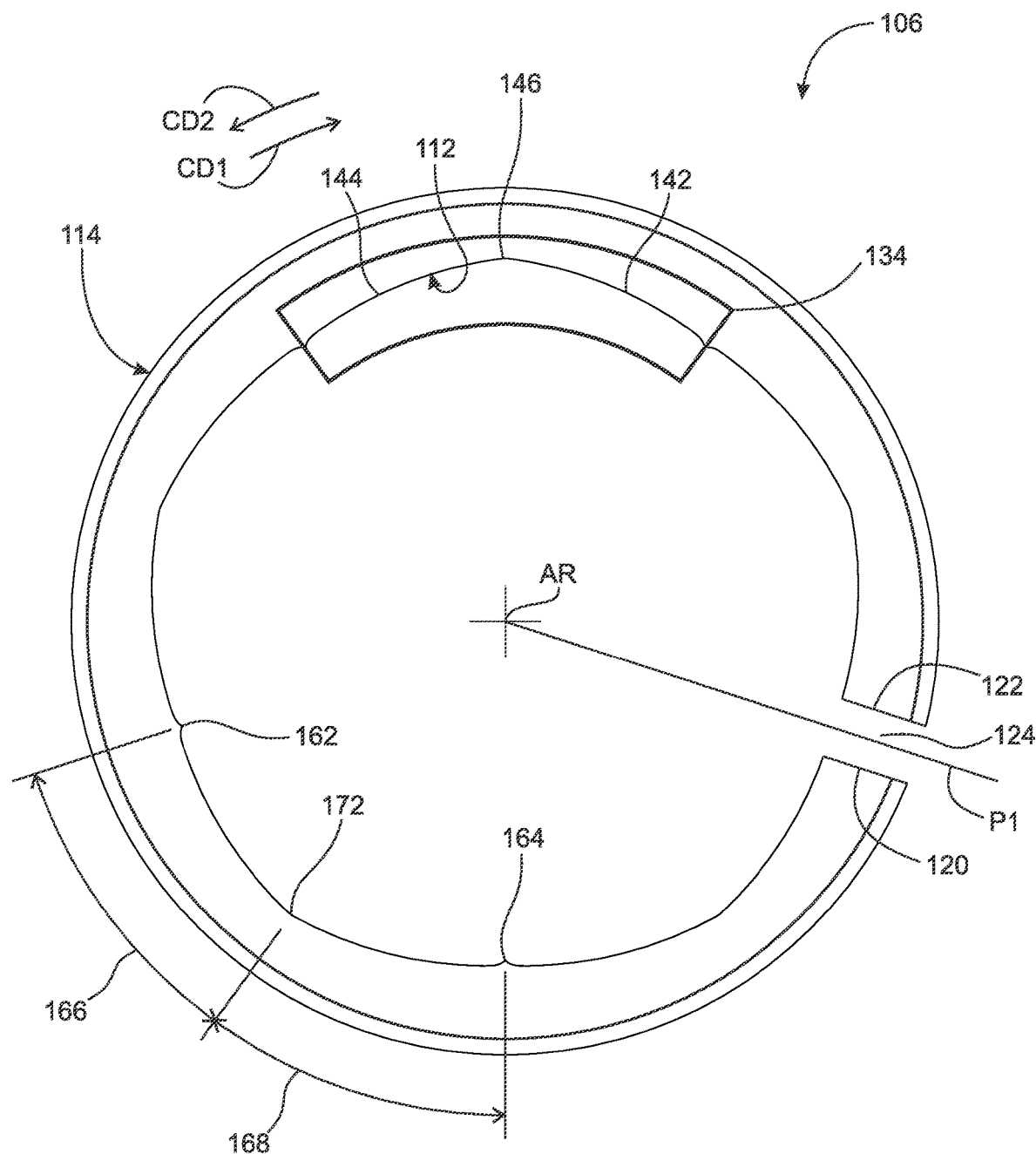
FIG. 5 is a front view of the wedge plate in FIG. 1.

FIG. 5 is a front view (in direction AD1) of wedge plate 106 in FIG. 1. The following should be viewed in light of FIGS. 1 through 5. Wedge plate 106 includes: circumferential end 120; circumferential end 122 facing circumferential end 120 in circumferential direction CD1; and gap 124 between ends 120 and 122. Wedge plate 106 is discontinuous, for example in direction CD1, at gap 124. For example, plane P1, co-linear with axis AR, passes through gap 124 without contacting plate 106. Wedge plate 106 is continuous, in circumferential direction CD1, except at gap 124, that is, wedge plate 106 is continuous from end 120 to end 122 in circumferential direction CD1.

Figure 6:
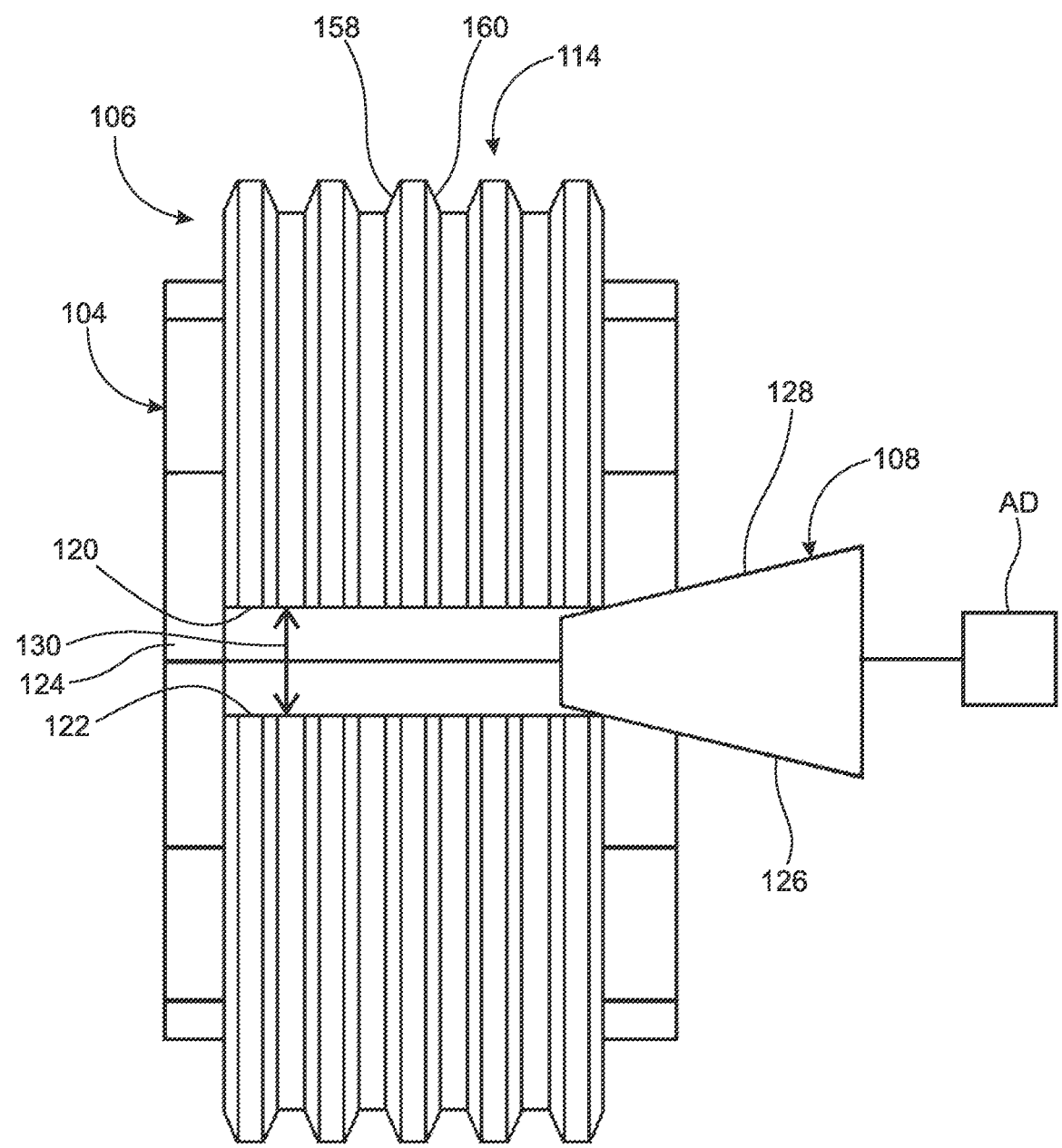
FIG. 6 is a side view of the cylindrical bi-directional wedge clutch in FIG. 2 with the carrier ring removed.
Figure 6:
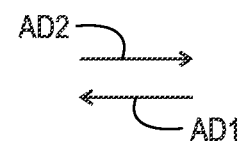

FIG. 6 is a side view of cylindrical bi-directional wedge clutch 100 in FIG. 2 (first or second locked mode) with carrier 102 removed. The following should be viewed in light of FIGS. 1 through 6. In the example of FIGS. 2 and 6, outer surfaces 126 and 128 of element 108 are in contact with surfaces 120 and 122, respectively, of plate 106. For example, element 108 has been displaced, in direction AD1, into gap 124 or further into gap 124. As a result, ends 120 and 122 are displaced in directions CD1 and CD2, respectively; circumferential extent 130 of gap 124 is increased; and dimension 117 is increased.

Figure 7:
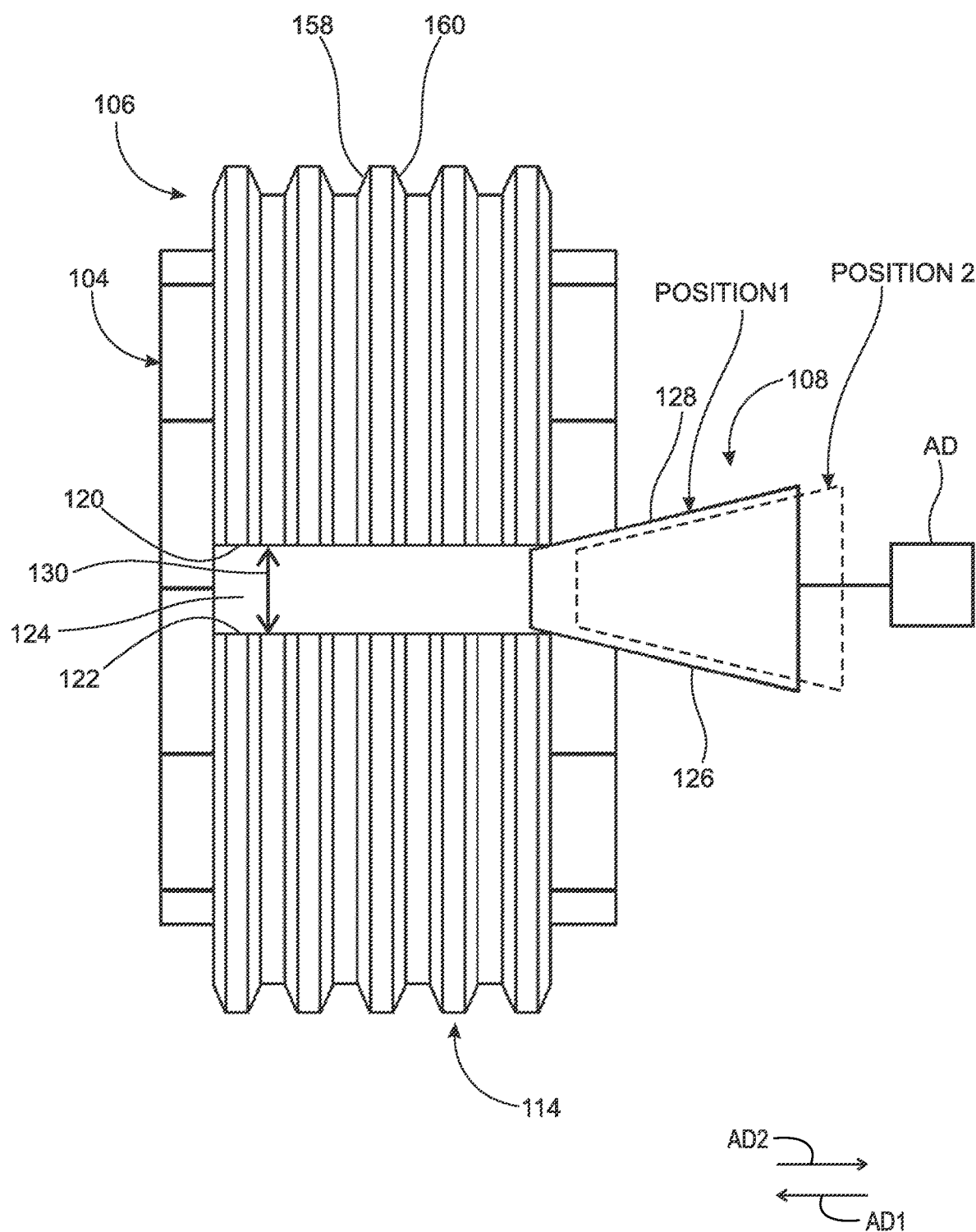
FIG. 7 is a side view of the cylindrical bi-directional wedge clutch in FIG. 3 with the carrier ring removed.

FIG. 7 is a side view of cylindrical bi-directional wedge clutch 100 in FIG. 3 (free-wheel mode) with carrier 102 removed. The following should be viewed in light of FIGS. 1 through 7. In the example of FIGS. 3 and 7, to transition from the first or second locked mode of FIGS. 2 and 6, to the free-wheel mode of FIGS. 3 and 7, element 108 has been displaced in axial direction AD2, opposite direction AD1.

The following is directed to the first operating mode. In an example embodiment, for the first locked mode, as long as torque continues to be applied to hub 104 in direction CD1, plate 106 remains displaced radially outwardly into non-rotatable contact with ring 102 and clutch 100 remains in the first locked mode. When torque in direction CD1 is removed from hub 104, clutch 100 is able to transition to the free-wheel mode. In an example embodiment, for the second locked mode, as long as torque continues to be applied to hub 104 in direction CD2, plate 106 remains displaced radially outwardly into non-rotatable contact with ring 102 and clutch 100 remains in the first locked mode. When torque in direction CD2 is removed from hub 104, clutch 100 is able to transition to the free-wheel mode.

The following is directed to the second operating mode. In an example embodiment, for the first locked mode, as long as torque continues to be applied to ring 102 in direction CD1, plate 106 remains displaced radially outwardly into non-rotatable contact with ring 102 and clutch 100 remains in the first locked mode. When torque in direction CD1 is removed from ring 102, clutch 100 is able to transition to the free-wheel mode. In an example embodiment, for the second locked mode, as long as torque continues to be applied to ring 102 in direction CD2, plate 106 remains displaced radially outwardly into non-rotatable contact with ring 102 and clutch 100 remains in the first locked mode. When torque in direction CD2 is removed from ring 102, clutch 100 is able to transition to the free-wheel mode.

The following is directed to both the first and second operating modes. Plate 106 is resilient and preloaded such that ends 120 and 122 are urged toward each other in directions CD2 and CD1, respectively. When the respective torques are removed from hub 104 or ring 102 (transition to the free-wheel mode), ends 120 and 122 displace in directions CD2 and CD1, respectively; circumferential extent 130 of gap 124 decreases; and dimension 117 decreases.

In the free-wheel mode, the preloading results in surface 112 contacting surface 110. Thus, plate 106 resists the circumferential expansion of gap 124 and plate 106 is non-rotatably connected to hub 104. In the example of FIG. 7, two positions are shown for element 108. For Position 1 (shown with solid lines) of element 108, surfaces 126 and 128 of element 108 are still in contact with surfaces 120 and 122, respectively, of plate 106. However, element 108 has been displaced a sufficient amount in direction AD2, from the position of element 108 in FIG. 6 to enable radial contraction of plate 108 (and reduction of dimension 117 and extent 130) sufficient for creation of gaps 118. That is, as element 108 is displaced in direction AD2, ends 120 and 122 slide down surfaces 126 and 128, respectively.

For Position 2 (shown with dashed lines) of element 108, element 108 has been displaced in direction AD2 such that surfaces 126 and 128 of element 108 are free of contact with surfaces 120 and 122, respectively, of plate 106. The radial contraction plate 108 (and reduction of dimension 117 and extent 130) is sufficient for creation of gaps 118.

Thus, to transition from the free-wheel mode to the locked mode, wedge element 108 is displaceable, in axial direction AD1, into gap 124; and to transition from the locked mode to the free-wheel mode, element 108 is displaceable, in direction AD2, within gap 124 and in an example embodiment, out of gap 124.

Figure 8:
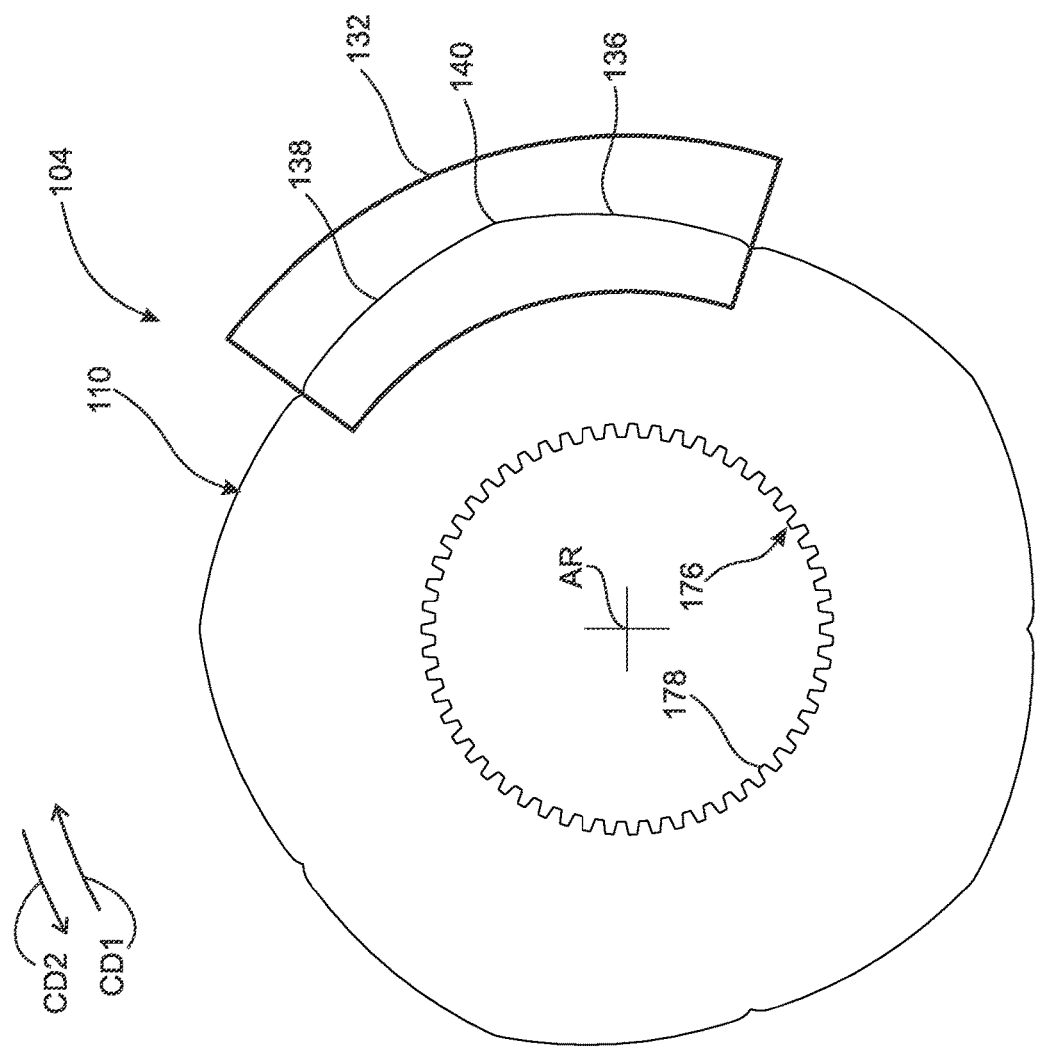
FIG. 8 is a front view of the hub in FIG. 1.

FIG. 8 is a front view (in direction AD1) of hub 104 in FIG. 1. Surface 110 of hub 102 includes ramp pairs 132. Surface 112 of the wedge plate 106 includes ramp pairs 134 in contact with ramp pairs 132, for example, due to the preloading of plate 106. Each ramp pair 132 includes: ramp surface 136 sloping radially inwardly along circumferential direction CD1; and ramp surface 138 connected to ramp surface 136 at portion 140 of surface 110 and sloping radially inwardly from ramp surface 136 and portion 140 along circumferential direction CD2. Each ramp pair 134 includes: ramp surface 142 sloping radially inwardly along circumferential direction CD1; and ramp surface 144 connected to ramp surface 142 at portion 146 of surface 112 and sloping radially inwardly from ramp surface 142 and portion 146 along circumferential direction CD2.

Radial inner surface 116 of carrier ring 102 includes circumferentially extending grooves 148. In an example embodiment, grooves 148 are circumferentially continuous. Pairs of circumferentially adjacent grooves 148 are separated from each other by respective portions 150 of surface 116. That is, grooves 148 are axially separated from each other. Surface 114 of plate 106 includes protrusions 152 extending radially outwardly and circumferentially. At least a respective portion of each protrusion 152 is located in a respective groove 148. In an example embodiment, protrusions 152 are circumferentially continuous. Line L1, parallel to axis AR and in direction AD1, passes through, in sequence, carrier 102, protrusion 152A, carrier 102, and protrusion 152B. In an example embodiment, one or both of carrier 102 and hub 104 overlap plate 106 in one or both of directions AD1 and AD2. Capital letters are used to designate a specific component from a group of components otherwise designated by a three digit number, for example, protrusions 152A and 152B are specific examples of protrusions 152.

Figure 9A:
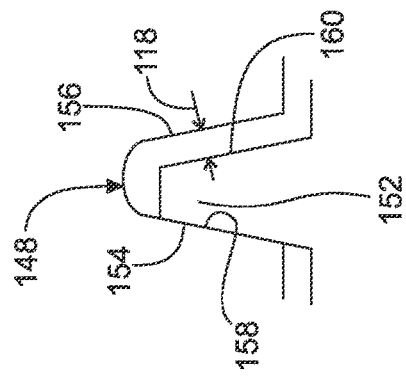
FIGS. 9A and 9B are details of area 9 in FIG. 3.
Figure 9B:
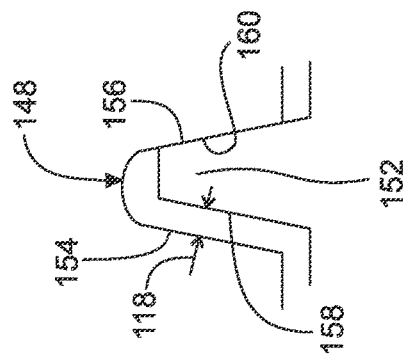

FIGS. 9A and 9B are details of area 9 in FIG. 3. In the free-wheel mode, the preloading of plate 106: brings ramps 142 into contact with ramps 136, and ramps 144 into contact with ramps 138; and creates gaps 118. As noted above, plate 106 rotates in unison with hub 104. Grooves 148 are formed in part by walls 154 and 156 and protrusions are 152 formed in part by walls 158 and 160. Gap 118 is formed between: walls 154 and 158 and walls 156 and 160 (as shown in FIG. 3); only walls 156 and 160 (as shown in FIG. 9A; or only walls 154 and 158 (as shown in FIG. 9B). In FIGS. 9A and 9B, the contact of plate 106 with carrier 102 is not sufficient to prevent plate 106 from rotating with hub 104, that is, the contact does not frictionally engage surfaces 114 and 116 to initiate the first or second locked mode. That is, the contact does not cause rotation between hub 104 and plate 106.

In an example embodiment, clutch 100 includes actuation device AD. Device AD can be any actuation device known in the art including, but not limited to: a hydraulic device; an electrical device; a mechanical device; an electro-mechanical device, or a pneumatic device. The discussion that follows assume the presence of device AD.

The following is directed to the first operating mode for clutch 100. To initiate the first locked mode from the free-wheel mode, hub 104 receives torque to rotate in direction CD1 and device AD displaces hub 104 in direction AD1 to force surface 114 radially outward (increase dimension 117 and extent 130). The outward displacement of surface 114 brings: walls 154 and 158 into frictional contact; and walls 156 and 160 into frictional contact. The frictional contact between walls 154 and 158 and between walls 156 and 160 creates a drag force opposing the rotation of plate 106 with hub 104. Rotation between plate 106 and hub 104 causes ramp surfaces 142 to slide radially outwardly along ramp surfaces 136, displacing plate 106 radially outwardly. The continued rotation of hub 104 in direction CD1: compressively connects surfaces 136 and 142; and compressively engages plate 106 with hub 104 and ring 102, non-rotatably connecting hub 104, plate 106, and ring 102. Thus, hub 104, plate 106, and ring 102 rotate in direction CD1 and torque in direction CD1 is transmitted from hub 104 to ring 102.

To initiate the second locked mode from the free-wheel mode, hub 104 receives torque to rotate in direction CD2 and device AD displaces hub 104 in direction AD1 to force surface 114 radially outward (increase dimension 117 and extent 130). The outward displacement of surface 114 brings: walls 154 and 158 into frictional contact; and walls 156 and 160 into frictional contact. The frictional contact between walls 154 and 158 and between walls 156 and 160 creates a drag force opposing the rotation of plate 106 with hub 104. Rotation between plate 106 and hub 104 causes ramp surfaces 144 to slide radially outwardly along ramp surfaces 138, displacing plate 106 radially outwardly. The continued rotation of hub 104 in direction CD2: compressively connects surfaces 138 and 142; and compressively engages plate 106 with hub 104 and ring 102, non-rotatably connecting hub 104, plate 106, and ring 102. Thus, hub 104, plate 106, and ring 102 rotate in direction CD2 and torque in direction CD2 is transmitted from hub 104 to ring 102.

The following is directed to the second operating mode for clutch 100. To initiate the first locked mode from the free-wheel mode, ring 102 receives torque to rotate in direction CD1 and device AD displaces hub 104 in direction AD1 to force surface 114 radially outward (increase dimension 117 and extent 130). The outward displacement of surface 114 brings: walls 154 and 158 into frictional contact; and walls 156 and 160 into frictional contact. The frictional contact between walls 154 and 158 and between walls 156 and 160 creates a drag force opposing the rotation of plate 106 with hub 104. Rotation between plate 106 and hub 104 causes ramp surfaces 144 to slide radially outwardly along ramp surfaces 138, displacing plate 106 radially outwardly. The continued rotation of hub 104 in direction CD1: compressively connects surfaces 144 and 138; and compressively engages plate 106 with hub 104 and ring 102, non-rotatably connecting hub 104, plate 106, and ring 102. Thus, hub 104, plate 106, and ring 102 rotate in direction CD1 and torque in direction CD1 is transmitted from carrier ring 102 to hub 104.

To initiate the second locked mode from the free-wheel mode, carrier ring 102 receives torque to rotate in direction CD2 and device AD displaces hub 104 in direction AD1 to force surface 142 radially outward (increase dimension 108 and extent 124). The outward displacement of surface 114 brings: walls 154 and 158 into frictional contact; and walls 156 and 160 into frictional contact. The frictional contact between walls 154 and 158 and between walls 156 and 160 creates a drag force opposing the rotation of plate 106 with hub 104. Rotation between plate 106 and hub 104 causes ramp surfaces 142 to slide radially outwardly along ramp surfaces 136 in direction CD1, displacing plate 106 radially outwardly. The continued rotation of hub 104 in direction CD2: compressively connects surfaces 142 and 136; and compressively engages plate 106 with hub 104 and ring 102, non-rotatably connecting hub 104, plate 106, and ring 102. Thus, hub 104, plate 106, and ring 102 rotate in direction CD2 and torque in direction CD2 is transmitted from hub 104 to carrier ring 102.

The following is applicable to both the first and second operating modes for clutch 100. Energy is required to displace element 108 in direction AD1 to initiate the first and second locked modes. For continued operation in the first and second locked modes, the energy urging element 108 can be removed, reducing the energy budget for clutch 100, as long as torque continues to be applied to ring 102 or hub 104 as the case may be, in the original circumferential direction initiating the locked mode. That is, as long as the torque is applied in the original circumferential direction, the compressive engagement of surfaces 136 and 142 or surfaces 138 and 144 keeps plate 106 non-rotatably engaged with ring 102 and hub 104, without the necessity of element 108 urging plate 106 radially outwardly.

The following is applicable to both the first and second operating modes for clutch 100. Clutch 100 can transition between the first and second locked modes when element 108 remains in the position shown in FIG. 6. That is, once element 108 is displaced to initiate the first or second locked mode, element 108 can be left in place to enable transition between the first and second locked modes. For example, if clutch 100 is used in an all-wheel drive axle: in the first locked mode (analogous to a drive mode), an engine accelerates the vehicle; and in the second locked mode (analogous to a coast mode), the engine decelerates the car. Stated otherwise, transitions between the first and second locked modes are implemented automatically (for example, tracking driving conditions for a vehicle employing clutch 100) without requiring displacement of element 108.

To transition from the first or second locked mode to the free-wheel mode, device AD displaces element 108 in direction AD2 and the torque being supplied to ring 102 or hub 104 is removed. The preloading of plate 106 contracts plate 106 radially inwardly (dimension 117 and extent 130 decrease) until the frictional/compressive contact of walls 154 and 158, and walls 156 and 160 is lessened or completely removed. That is, at least one area of contact 161 between ring 102 and plate 106, in particular between protrusions 152 and ring 102, is lessened. In FIG. 2, only a typical portion of the total contact area between ring 102 and plate 106, in particular between protrusions 152 and surface 116, is designated. The lessening or removal of the frictional/compressive contact of walls 154 and 158, and walls 156 and 160 enables hub 104 and plate 106 to rotate with respect to ring 102.

Referring to FIG. 4: each ramp surface 142 includes edge 162 bounding ramp surface 142 in direction CD1; and each ramp surface 144 includes edge 164 bounding ramp surface 144 in direction CD2. Each ramp surface 142 has dimension 166, in direction CD1, from portion 146 to edge 162. Each ramp surface 144 has dimension 168, in direction CD1, from edge 164 to portion 146. Ramps 142 and 144 have dimension 170 along direction AD1. In an example embodiment, dimension 170 is greater than dimension 166 or 168. In an example embodiment, dimension 170 is greater than each of dimensions 166 and 168.

In an example embodiment: edges 162 and 164 are parallel to axis of rotation AR; portion 146 includes edge 172 parallel to axis of rotation AR; dimension 166 is from the edge 172 to edge 162; and circumferential dimension 166 is from edge 164 to edge 172.

In known wedge plate clutches, circumferential dimensions analogous to dimension 166 and 168 are typically much smaller than an axial dimension analogous to dimension 170. Advantageously, for clutch 100, dimensions 166 and 168 can be made generally similar to analogous circumferential dimension for known clutch plate wedges, and increasing dimension 170, with respect to analogous axial dimensions, greatly increases the area of contact between hub 104 and plate 106, greatly increasing the torque-carrying capacity of clutch 100.

In an example embodiment: ring 102 includes radially outwardly extending splines, or teeth 174 arranged to non-rotatably connect to a shaft (not shown); and radially inner surface 176 of hub 104 includes splines, or teeth 178 arranged to non-rotatably connect to a shaft (not shown).

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AR axis of rotation
100 cylindrical bi-directional clutch
102 carrier ring
104 hub
106 wedge plate
108 wedge element
110 outer surface of hub 104
112 inner surface of plate 106
114 outer surface of plate 106
116 inner surface of carrier 102
117 radial dimension of plate 106
118 gap between surfaces 114 and 116
120 circumferential end of plate 106
122 circumferential end of plate 106
124 gap between surfaces 120 and 122
P1 axial plane
126 surface of element 108
128 surface of element 108
130 circumferential extent of gap 124
132 ramp pairs for hub 104
134 ramp pairs for plate 106
136 ramp surface for pair 132
138 ramp surface for pair 132
140 portion of surface 110
142 ramp surface for pair 134
144 ramp surface for pair 134
146 portion of surface 112
148 grooves in surface 116
150 portions of surface 116
152 protrusions on surface 114
L1 line
154 wall of groove 148
156 wall of groove 148
158 wall of protrusion 152
160 wall of protrusion 152
AD actuation device
161 area of contact between ring 102 and plate 106
162 edge of ramp 142
164 edge of ramp 144
166 dimension of ramp 142
168 dimension of ramp 144
170 dimension of ramps 142 and 144 along AD1
172 edge of portion 146
174 splines on ring 102
176 inner surface of hub 104
178 splines on surface 176

The invention claimed is:

1. A cylindrical bi-directional wedge clutch, comprising:
an axis of rotation;
a carrier ring;
a hub;
a wedge plate including at least a portion radially disposed between the carrier ring and the hub; and,
a wedge element:
displaceable, for first and second locked modes in which the hub and the carrier ring are non-rotatably connected, in a first axial direction to contact the wedge plate and expand the wedge plate radially outwardly; and,
displaceable, for a free-wheel mode in which the hub and the carrier ring are rotatable with respect to each other, in a second axial direction, opposite the first axial direction, wherein:
for the first locked mode, the hub and carrier ring are arranged to rotate in a first circumferential direction; and,
for the second locked mode, the hub and carrier ring are arranged to rotate in a second circumferential direction, opposite the first circumferential direction.

2. The cylindrical bi-directional wedge clutch of claim 1, wherein:
for a first operating mode, the hub is arranged to:
receive, for the first and second locked modes, first and second torque in the first and second circumferential directions, respectively; and,
transmit the first and second torque to the carrier ring; and,
for a second operating mode, the carrier ring is arranged to:
receive, for the first and second locked modes, third and fourth torque in the first and second circumferential directions, respectively; and,
transmit the third and fourth torque to the hub.

3. The cylindrical bi-directional wedge clutch of claim 2, wherein:
the hub includes a radially outer surface with a plurality of first ramp pairs;
each first ramp pair includes:
a first ramp surface sloping radially inwardly in the first circumferential direction; and,
a second ramp surface connected to the first ramp surface and sloping radially inwardly from the first ramp surface in the second circumferential direction;
the wedge plate includes a radially inner surface with a plurality of second ramp pairs in contact with the plurality of first ramp pairs; and,
each second ramp pair includes:
a third ramp surface sloping radially inwardly in the first circumferential direction; and,
a fourth ramp surface connected to the third ramp surface and sloping radially inwardly from the third ramp surface in the second circumferential direction.

4. The cylindrical bi-directional wedge clutch of claim 3, wherein for the first and second locked modes, the first ramp surfaces or the second ramp surfaces are arranged to displace the wedge plate radially outwardly to non-rotatably connect the hub, the wedge plate and the carrier ring.

5. The cylindrical bi-directional wedge clutch of claim 3, wherein:
for the first operating mode:
in the first locked mode, the first ramp surfaces are arranged to compressively engage the third ramp surfaces; and,
in the second locked mode, the second ramp surfaces are arranged to compressively engage the fourth ramp surfaces; and,
for the second operating mode:
in the first locked mode, the fourth ramp surfaces are arranged to compressively engage the second ramp surfaces; and,
in the second locked mode, the third ramp surfaces are arranged to compressively engage the first ramp surfaces.

6. The cylindrical bi-directional wedge clutch of claim 1, wherein:
the wedge plate includes:
a first circumferential end;
a second circumferential end facing the first circumferential end in the first circumferential direction; and,
a gap between the first and second circumferential ends; and,
the wedge plate is discontinuous at the gap.

7. The cylindrical bi-directional wedge clutch of claim 6, wherein the wedge plate is continuous, in the first circumferential direction, from the first circumferential end to the second circumferential end.

8. The cylindrical bi-directional wedge clutch of claim 6, wherein to transition from the free-wheel mode to the first and second locked modes, the wedge element is displaceable, in the first axial direction, into the gap.

9. The cylindrical bi-directional wedge clutch of claim 6, wherein for the first and second locked modes, the wedge element is in contact with the first and second circumferential ends.

10. The cylindrical bi-directional wedge clutch of claim 6, wherein:
the wedge element includes first and second surfaces sloping toward each other in the first axial direction; and,
in the first and second locked modes, the first and second surfaces are in contact with the first and second circumferential ends, respectively.

11. The cylindrical bi-directional wedge clutch of claim 6, wherein:
the wedge element includes an axial end facing in the first axial direction; and,
in the first and second locked modes, the axial end is located in the gap.

12. The cylindrical bi-directional wedge clutch of claim 1, wherein:
the carrier ring includes a radial inner surface including a plurality of circumferentially extending grooves;
respective grooves are separated from each other in the first axial direction;
the wedge plate includes a radial outer surface with a plurality of protrusions;
at least a portion of each protrusion is located in a respective circumferentially extending groove;
in the free-wheel mode, the wedge plate is rotatable with respect to the carrier ring; and,
to initiate the first and second locked modes from the free-wheel mode, the wedge element is arranged to displace the radial outer surface radially outwardly to frictionally contact the plurality of protrusions with the carrier ring.

13. A cylindrical bi-directional wedge clutch, comprising:
an axis of rotation;
a carrier ring;
a hub including a radial outer surface with first and second ramp surfaces;
a wedge plate including at least a portion radially disposed between the carrier ring and the hub and including a radial inner surface with third and fourth ramps surfaces; and,
a wedge element:
displaceable, in a first axial direction, for first and second locked modes in which the hub, the wedge plate, and the carrier ring are non-rotatably connected, to expand the wedge plate radially outwardly; and,
displaceable in a second axial direction, opposite the first axial direction, for a free-wheel mode in which the hub and the carrier ring are rotatable with respect to each other, wherein:
for the first locked mode, the hub and carrier ring are arranged to rotate in the first circumferential direction; and,
for the second locked mode, the hub and carrier ring are arranged to rotate in a second circumferential direction, opposite the first circumferential direction.

14. The cylindrical bi-directional wedge clutch of claim 13, wherein for the first and second locked modes, the first ramp surface or the second ramp surface is arranged to displace the wedge plate radially outwardly to non-rotatably connect the hub, the wedge plate and the carrier ring.

15. The cylindrical bi-directional wedge clutch of claim 13, wherein:
for a first operating mode, the hub is arranged to:
receive, for the first and second locked modes, first and second torque in the first and second circumferential directions, respectively; and,
transmit the first and second torque to the carrier ring; and,
for a second operating mode, the carrier ring is arranged to:
receive, for the first and second locked modes, first and second torque in the first and second circumferential directions, respectively; and,
transmit the first and second torque to the hub.

16. The cylindrical bi-directional wedge clutch of claim 15, wherein:
for the first operating mode:
in the first locked mode, the first ramp surface is arranged to compressively engage the third ramp surface; and,
in the second locked mode, the second ramp surface is arranged to compressively engage the fourth ramp surface; and,
for the second operating mode:
in the first locked mode, the fourth ramp surface is arranged to compressively engage the second ramp surface; and,
in the second locked mode, the third ramp surface is arranged to compressively engage the first ramp surface.

17. The cylindrical bi-directional wedge clutch of claim 13, wherein:
the wedge plate includes first and second axial ends; and,
the third and fourth ramp surfaces:

slope radially inwardly in the first and second circumferential directions, respectively;
include first and second circumferential dimensions, respectively; and,
each include a first dimension, from the first axial end to the second axial end, greater than either of the first or second circumferential dimensions.

18. A cylindrical bi-directional wedge clutch, comprising:
an axis of rotation;
a carrier ring;
a hub;
a wedge plate including at least a portion radially disposed between the carrier ring and the hub and including:
a first circumferential end;
a second circumferential end facing the first circumferential end in a first circumferential direction; and,
a gap, in the first circumferential direction, between the first and second circumferential ends; and,
a wedge element, displaceable in a first axial direction:
to engage the first and second circumferential ends; and,
to expand the wedge plate radially outwardly for first and second locked modes in which the hub, the wedge plate and the carrier ring are non-rotatably connected, wherein:
for a first locked mode, the hub and carrier ring rotate in the first circumferential direction; and,
for a second locked mode, the hub and carrier ring rotate in a second circumferential direction, opposite the first circumferential direction.

19. The cylindrical bi-directional wedge clutch of claim 18, wherein:
for a first operating mode, the hub is arranged to:
receive, for the first and second locked modes, first and second torque in the first and second circumferential directions, respectively; and,
transmit the first and second torque to the carrier ring; and,
for a second operating mode, the carrier ring is arranged to:
receive, for the first and second locked modes, third and fourth torque in the first and second circumferential directions, respectively; and,
transmit the third and fourth torque to the hub.

20. The cylindrical bi-directional wedge clutch of claim 18, wherein:
for a free-wheel mode, the hub and carrier ring are rotatable with respect to each other;
to transition from the first or second locked mode to the free-wheel mode, the wedge element is displaceable in a second axial direction, opposite the first axial direction; and,
in the free wheel mode:
the wedge element is in contact with the first and second circumferential ends; or,
the wedge element is free of contact with the first and second circumferential ends.

* * * * *